(12) United States Patent
Wakelam et al.

(10) Patent No.: US 11,203,027 B2
(45) Date of Patent: Dec. 21, 2021

(54) LOWER GAS FLOW INJECTION SYSTEM AND METHOD FOR ADDITIVE MANUFACTURING SYSTEM

(71) Applicant: General Electric Company, Schenectady, NY (US)

(72) Inventors: Christian Thomas Wakelam, Munich (DE); Rene du Cauze de Nazelle, Garching (DE); Mohammed Mounir Shalaby, Schenectady, NY (US); Kishore Ramakrishnan, Rexford, NY (US); Jens Stammberger, Lichtenfels (DE)

(73) Assignee: General Electric Company, Schenectady, NY (US)

( * ) Notice: Subject to any disclaimer, the term of this patent is extended or adjusted under 35 U.S.C. 154(b) by 419 days.

(21) Appl. No.: 16/107,696

(22) Filed: Aug. 21, 2018

(65) Prior Publication Data

US 2020/0061653 A1 Feb. 27, 2020

(51) Int. Cl.
*B05B 12/08* (2006.01)
*B29C 64/153* (2017.01)
(Continued)

(52) U.S. Cl.
CPC ............. *B05B 12/087* (2013.01); *B05B 7/08* (2013.01); *B05B 12/006* (2013.01); *B22F 10/20* (2021.01);
(Continued)

(58) Field of Classification Search
CPC ............. B22F 2201/00; B22F 2201/10; B22F 2201/11; B22F 10/20; B29C 64/153;
(Continued)

(56) References Cited

U.S. PATENT DOCUMENTS 4,539,930 A 9/1985 Stuck et al.
5,067,509 A 11/1991 Hunter
(Continued)

FOREIGN PATENT DOCUMENTS

KR 101760832 B1 * 7/2017
KR 101760832 B1   7/2017
WO 2007112808 A1 10/2007

OTHER PUBLICATIONS

International Search Report/Written Opinion; PCT/US2019/047479, dated Nov. 6, 2019; 11 pages.
(Continued)

*Primary Examiner* — Nahida Sultana
*Assistant Examiner* — Jamel M Nelson
(74) *Attorney, Agent, or Firm* — Dority & Manning, P.A.

(57) ABSTRACT

An additive manufacturing (AM) system includes a housing defining a chamber, a build platform disposed in the chamber at a first elevation, and a lower gas inlet disposed at a second elevation and configured to supply a lower gas flow. The AM system includes a contoured surface extending between the lower gas inlet and the build platform to direct the lower gas flow from the second elevation at the lower gas inlet to the first elevation at the build platform, where the contoured surface discharges the lower gas flow in a direction substantially parallel to the build platform. The AM system also includes one or more gas delivery devices coupled to the lower gas inlet to regulate one or more flow characteristics of the lower gas flow, and a gas outlet configured to discharge the lower gas flow.

15 Claims, 5 Drawing Sheets

(51) Int. Cl.
*B29C 64/245* (2017.01)
*B29C 64/371* (2017.01)
*B05B 7/08* (2006.01)
*B05B 12/00* (2018.01)
*B22F 10/20* (2021.01)
*B33Y 10/00* (2015.01)
*B33Y 30/00* (2015.01)
*B33Y 40/00* (2020.01)

(52) U.S. Cl.
CPC .......... *B29C 64/153* (2017.08); *B29C 64/245* (2017.08); *B29C 64/371* (2017.08); *B22F 2201/11* (2013.01); *B33Y 10/00* (2014.12); *B33Y 30/00* (2014.12); *B33Y 40/00* (2014.12)

(58) Field of Classification Search
CPC ..... B29C 64/245; B29C 64/25; B29C 64/364; B29C 64/371; B05B 12/087; B05B 12/006; B05B 7/08
See application file for complete search history.

(56) References Cited

U.S. PATENT DOCUMENTS

| 5,356,120 | A | 10/1994 | Koenig et al. |
| 8,439,478 | B2 | 5/2013 | Kanata et al. |
| 2009/0266803 | A1 | 10/2009 | Perret et al. |
| 2017/0120330 | A1* | 5/2017 | Sutcliffe ............... B29C 64/268 |
| 2017/0274595 | A1 | 9/2017 | Swartz et al. |
| 2017/0291358 | A1 | 10/2017 | Donovan |
| 2018/0126460 | A1* | 5/2018 | Murphree ............... B22F 12/00 |

OTHER PUBLICATIONS

Philo, A.M., et al.; "A Study Into The Effects Of Gas Flow Inlet Design Of The Renishaw Am250 Laser Powder Bed Fusion Machine Using Computational Modelling," 2017: Proceedings of the 28th Annual International Solid Freeform Fabrication Symposium, pp. 1-18, Dec. 2017.

* cited by examiner

LOWER GAS FLOW INJECTION SYSTEM AND METHOD FOR ADDITIVE MANUFACTURING SYSTEM

BACKGROUND

The subject matter disclosed herein generally relates to an additive manufacturing system and method, and more specifically, to a Direct Laser Sintering (DLS) or Direct Laser Melting (DLM) system and method that employs focused energy to selectively fuse a powder material to produce an object.

Additive manufacturing (AM) processes generally involve the buildup of one or more materials to make a net or near-net shape object, in contrast to subtractive manufacturing methods, which selectively remove material from an initial form to fabricate an object. Though "additive manufacturing" is an industry standard term (ASTM F2792), it encompasses various manufacturing and prototyping techniques known under a variety of names, including freeform fabrication, 3D printing, and rapid prototyping/tooling. A particular type of AM process uses a focused energy source (e.g., an electron beam, a laser beam) to sinter or melt a powder material deposited on a build platform within a chamber, creating a solid three-dimensional object in which particles of the powder material are bonded together.

Laser sintering/melting, as used in Direct Laser Sintering (DLS) and/or Direct Laser Melting (DLM), is a common industry term used to refer to a method of producing three-dimensional (3D) objects by using a laser beam to sinter or melt a fine powder. In particular, laser sintering/melting techniques often entail projecting a laser beam onto a controlled amount of powder (e.g., a powder bed) on a substrate, so as to form a layer of fused particles or molten material thereon. When the laser beam interacts with the powder at a powder bed, smoke and/or a particulate matter (e.g., condensate, spatter) is produced within the chamber. The smoke and/or the particular matter may be detrimental to the quality of the resulting object. As an example, the suspended smoke and/or particular matter within the chamber can interfere with the laser beam and reduce the energy or intensity of the laser beam before it reaches the powder bed. As another example, the smoke and/or the particular matter may deposit onto the powder bed and may become incorporated into the resulting object.

In certain laser sintering/melting (or DLS/DLM) systems, a gas flow is introduced in an upper portion of the chamber (e.g., toward the top of the chamber in the z-direction and away from the build platform) to flow generally parallel to the build platform in an effort to remove the smoke and/or particulate matter and prevent deposition. However, this upper gas flow may not efficiently remove the smoke and/or particulate matter in the lower portion of the chamber (e.g., toward the build platform and away from the top of the chamber in the z-direction). Accordingly, particulate matter may become trapped or deposited within the lower portion of the chamber, which can lower the quality of the resulting object of the DLS/DLM processes.

BRIEF DESCRIPTION

In one embodiment, an additive manufacturing system includes a housing defining a chamber, a build platform disposed in a lower portion of the chamber at a first elevation with respect to the chamber, and a lower gas inlet disposed proximate an upstream end portion of the chamber, where the lower gas inlet is disposed at a second elevation with respect to the chamber and is configured to supply a lower gas flow. The additive manufacturing system also includes a contoured surface extending between the lower gas inlet and the build platform. The contoured surface is configured to direct the lower gas flow from the second elevation at the lower gas inlet to the first elevation at the build platform and discharge the lower gas flow in a direction substantially parallel to the build platform. The additive manufacturing system also includes one or more gas delivery devices coupled to the lower gas inlet configured to regulate one or more flow characteristics of the lower gas flow, and a gas outlet disposed in a downstream end portion of the chamber, where the gas outlet is configured to discharge the lower gas flow from the chamber.

In another embodiment, a method of operating an additive manufacturing system includes depositing a bed of a powder material on a build platform positioned at a first elevation within a chamber, supplying a lower gas flow into a lower portion of the chamber at a second elevation, and directing the lower gas flow along a contoured surface via a fluid guiding effect from the second elevation to the first elevation, and then toward the build platform along a direction parallel to the build platform. The method also includes applying a focused energy beam to at least a portion of the bed of the powder material deposited on the build platform to form a solidified layer.

In another embodiment, an additive manufacturing system includes a housing defining a chamber, a build platform disposed in a lower portion of the chamber, and a lower gas inlet positioned a distance above or below the build platform in an upstream end portion of the chamber, where the lower gas inlet is configured to supply a lower gas flow. The additive manufacturing system also includes a contoured surface extending tangentially between the lower gas inlet and the build platform to direct the lower gas flow from the lower gas inlet toward the build platform, where the lower gas flow is configured to flow along the contoured surface and discharge from the contoured surface in a direction substantially parallel to the build platform. The additive manufacturing system also includes an upper gas inlet disposed in a first side wall of an upper portion of the chamber configured to supply an upper gas flow in the direction substantially parallel to the build platform, one or more gas delivery devices coupled to the lower and upper gas inlets configured to regulate one or more flow characteristics of the lower and upper gas flows, and a gas outlet disposed in a second side wall of the chamber, opposing the first side wall, where the gas outlet is configured to discharge the lower and upper gas flows from the chamber.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
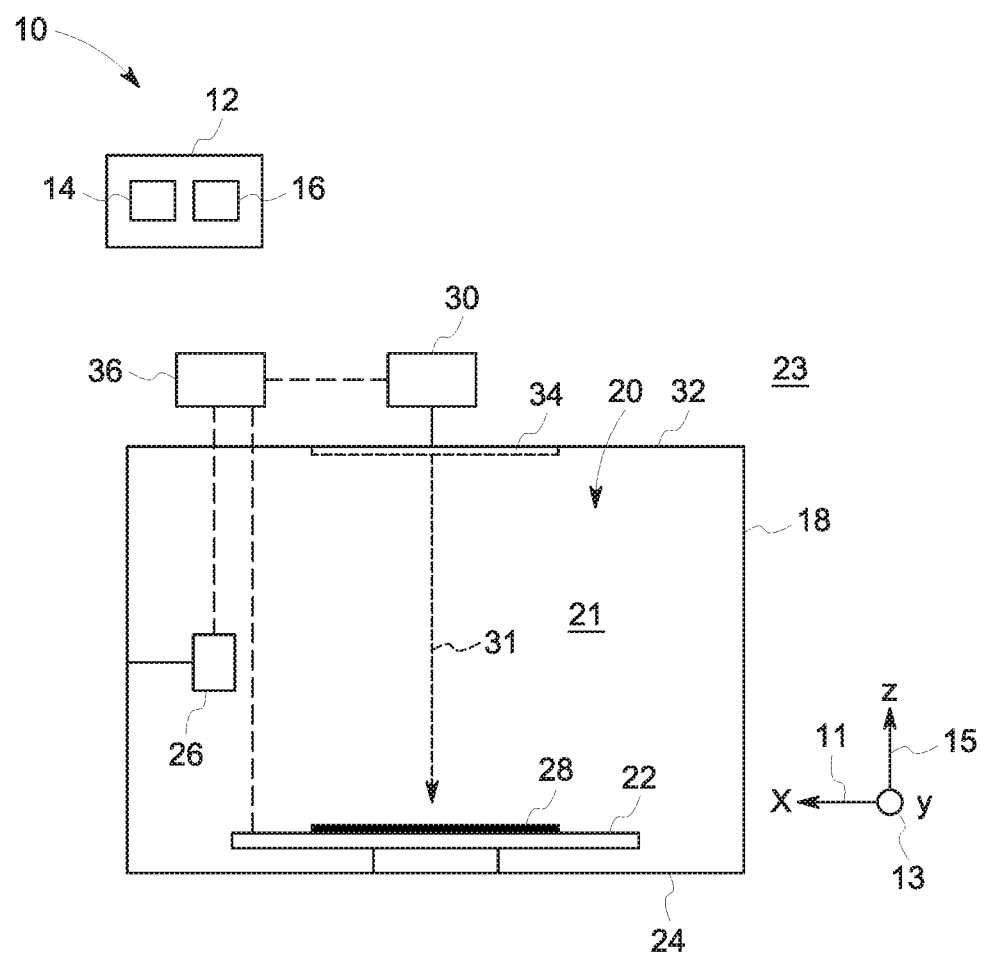
FIG. 1 is a schematic diagram of an embodiment of an additive manufacturing (AM) system having a manufacturing chamber, in accordance with present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise. The term "uniform gas flow", as used herein, means that the flow velocity of a gas flow does not significantly vary across a width and/or a length of a path of the gas flow. As used herein, the term "additive manufacturing", or "AM", relates to any suitable laser sintering/melting additive manufacturing technique, including, but not limited to: Direct Metal Laser Melting, Direct Metal Laser Sintering, Direct Metal Laser Deposition, Laser Engineered Net Shaping, Selective Laser Sintering, Selective Laser Melting, Selective Heat Sintering, Fused Deposition Modeling, Hybrid Systems, or combinations thereof.

The present disclosure generally encompasses systems and methods for fabricating objects using a laser sintering/melting-based method of additive manufacturing. As noted above, for such additive manufacturing techniques, when the laser beam sinters or melts the powder bed within an enclosed manufacturing chamber, smoke and/or particulate matter (e.g., condensate, spatter) can accumulate within the chamber. As mentioned, this smoke and/or the particulate matter may interact with the laser beam and/or the object being printed and interfere with the fabrication process. As such, it may be desirable to remove the smoke and/or the particulate matter from the chamber to improve the manufacturing process and/or the quality of the resulting object.

As discussed in detail below, embodiments of the present disclosure include additive manufacturing (AM) systems and methods that employ a combination of an upper gas flow in an upper portion of the chamber and a lower gas flow in a lower portion of the chamber, where the lower gas flow is generally directed parallel to a build platform of the chamber. The lower gas flow is supplied to the chamber via a lower gas inlet disposed above or beneath (e.g., with respect to the z-direction) the build platform. A contoured surface extends tangentially between the lower gas inlet and the build platform, or a surface adjacent the build platform. Accordingly, the contoured surface extends from an elevation of the lower gas inlet (e.g., an elevation above or below the build platform) to an elevation of the build platform. For clarity, the term "elevation", as used herein, refers to a distance at which a component of interest (e.g., the lower gas inlet, the build platform) is disposed vertically above a lower end portion of the AM system. The contoured surface is configured to receive the lower gas flow from the lower gas inlet and direct the lower gas flow to the elevation of the build platform. As described in greater detail herein, the contoured surface is configured to induce a fluid guiding effect that directs the lower gas flow from the elevation of the lower gas inlet to the elevation of the build platform. As used herein, the term "fluid guiding effect" includes the Coanda effect (e.g., the tendency of a flow of fluid to adhere to an adjacent flat or curved surface) or any other fluid dynamic effect that may influence a flow trajectory of a fluid along a surface. The fluid guiding effect enables the contoured surface to discharge (e.g., steer, point, direct) the lower gas flow in a direction parallel to the build platform.

The addition of the lower gas flow may advantageously overcome the above noted shortcomings of an AM system having only the upper gas flow by more efficiently removing the smoke and/or particulate matter from the chamber, as well as suppressing recirculation of the smoke and/or the particulate matter inside the chamber of the AM system. As such, the stagnation and/or deposition of the smoke and/or particulate matter on various locations inside the chamber may be substantially reduced or eliminated, enabling improved quality of the resulting object of the AM process. In some embodiments, certain flow characteristics of the lower gas flow may be controlled or tuned to desirable levels that are favorable to generate, for example, the Coanda effect, and facilitate removing the smoke and/or particular matter from within the chamber. The flow characteristics may include, but are not limited to, flow rate (e.g., mass flow rate, volume flow rate), flow velocity (e.g., in meters per second (m/s)), flow direction or angle, flow temperature, or any combination thereof. These and other features will be described below with reference to the drawings.

FIG. 1 illustrates an example embodiment of an AM system 10 (e.g., a laser sintering/melting AM system 10) for producing an article or object using a focused energy source (e.g., a laser) or beam. To facilitate discussion, the AM system 10 and its components will be described with reference to an x-axis or direction 11, a y-axis or direction 13, and a z-axis or direction 15. In the illustrated embodiment, the AM system 10 includes a controller 12 having memory circuitry 14 that stores instructions (e.g., software, applications), as well as processing circuitry 16 configured to execute these instructions to control various components of the AM system 10. The AM system 10 includes a housing 18 defining a manufacturing chamber 20 (also referred to herein as chamber 20) that defines an interior volume 21. The chamber 20 is sealed to contain an inert atmosphere and to protect the build process from an ambient atmosphere 23 outside of the chamber 20. The AM system 10 includes a build platform 22 disposed inside the chamber 20 on a bottom surface or bottom wall 24 of the housing 18. Accordingly, the illustrated build platform 22 is oriented substantially parallel to the bottom wall 24 of the housing 18. For example, an angle between the build platform 22 and the bottom wall 24 may be less than 5 degrees (°), less than 3°, or less than 1°. In some embodiments, the build platform 22 may have a working area (e.g., the top surface of the build platform 22) in a range between about 0.01 square meters (m²) and about 1.5 m². The article or object of the AM process is fabricated on the build platform 22, as discussed below.

The AM system 10 includes a powder application device 26, which may be arranged inside the chamber 20 to repeatedly deposit a quantity (e.g., a layer or bed) of a powder material onto the build platform 22. The powder material deposited on the build platform 22 generally forms a powder bed 28. The powder material may include, but is not limited to, polymers, plastics, metals, ceramics, sand, glass, waxes, fibers, biological matter, composites, or hybrids of these materials. These materials may be used in a variety of forms as appropriate for a given material and method, including, for example, solids, powders, sheets, foils, tapes, filaments, pellets, wires, atomized, and combinations of these forms.

The AM system 10 includes an energy generating system 30, which may be arranged inside or outside the chamber 20 for generating and selectively directing a focused energy beam 31, such as laser, onto at least a portion of the powder bed 28 disposed on the build platform 22. For the embodiment illustrated in FIG. 1, the energy generating system 30 is arranged outside the chamber 20 in proximity to a top surface or a top wall 32 of the housing 18, opposite to the bottom surface or the bottom wall 24. The focused energy beam 31 enters the chamber 20 through a window 34 disposed within the top wall 32. The powder bed 28 disposed on the build platform 22 is subjected to the focused energy beam 31 in a selective manner as controlled by the controller 12, depending on the desired geometry of the article. In some embodiments, the energy generating system 30 includes a focused energy source for generating the focused energy beam 31. In some embodiments, the focused energy source includes a laser source and the focused energy beam 31 is a laser beam. In some embodiments, the laser source includes a pulsed laser source that generates a pulsed laser beam. The pulsed laser beam is not emitted continuously, in contrast with a continuous laser radiation, but is emitted in a pulsed manner (e.g., in time limited pulses with interval). In some embodiments, the energy generating system 30 includes a plurality of focused energy sources that is configured to selectively irradiate the powder bed 28 using the focused energy beam 31.

The AM system 10 includes a positioning system 36 (e.g., a gantry or other suitable positioning system), which may be arranged inside the chamber 20. The positioning system 36 may be any multidimensional positioning system, such as a delta robot, cable robot, robot arm, or another suitable positioning system. The positioning system 36 may be operatively coupled to the powder application device 26, the energy generating system 30, the build platform 22, or a combination thereof. The positioning system 36 may move the powder application device 26, the energy generating system 30, the build platform 22, or a combination thereof, relatively to one another, in any of the x-, y-, and z-directions 11, 13, 15, or a combination thereof.

The AM system 10 is further configured to supply an upper gas flow and a lower gas flow into the chamber 20, as well as discharge a gas flow from the chamber 20, as will be discussed in FIG. 2. The gas flow being discharged or exhausted from the chamber 20 includes the upper gas flow, the lower gas flow, as well as a substantial portion of any smoke and/or particulate matter that is generated on application of the focused energy beam 31 to selectively melt or sinter the powder bed 28 during formation of the desired article. By employing a combination of the upper and lower gas flows as set forth herein, recirculation of the smoke and/or particulate matter within the chamber may be substantially reduced or eliminated, thus substantially improving the quality of the build process and/or the article being printed.

Figure 2:
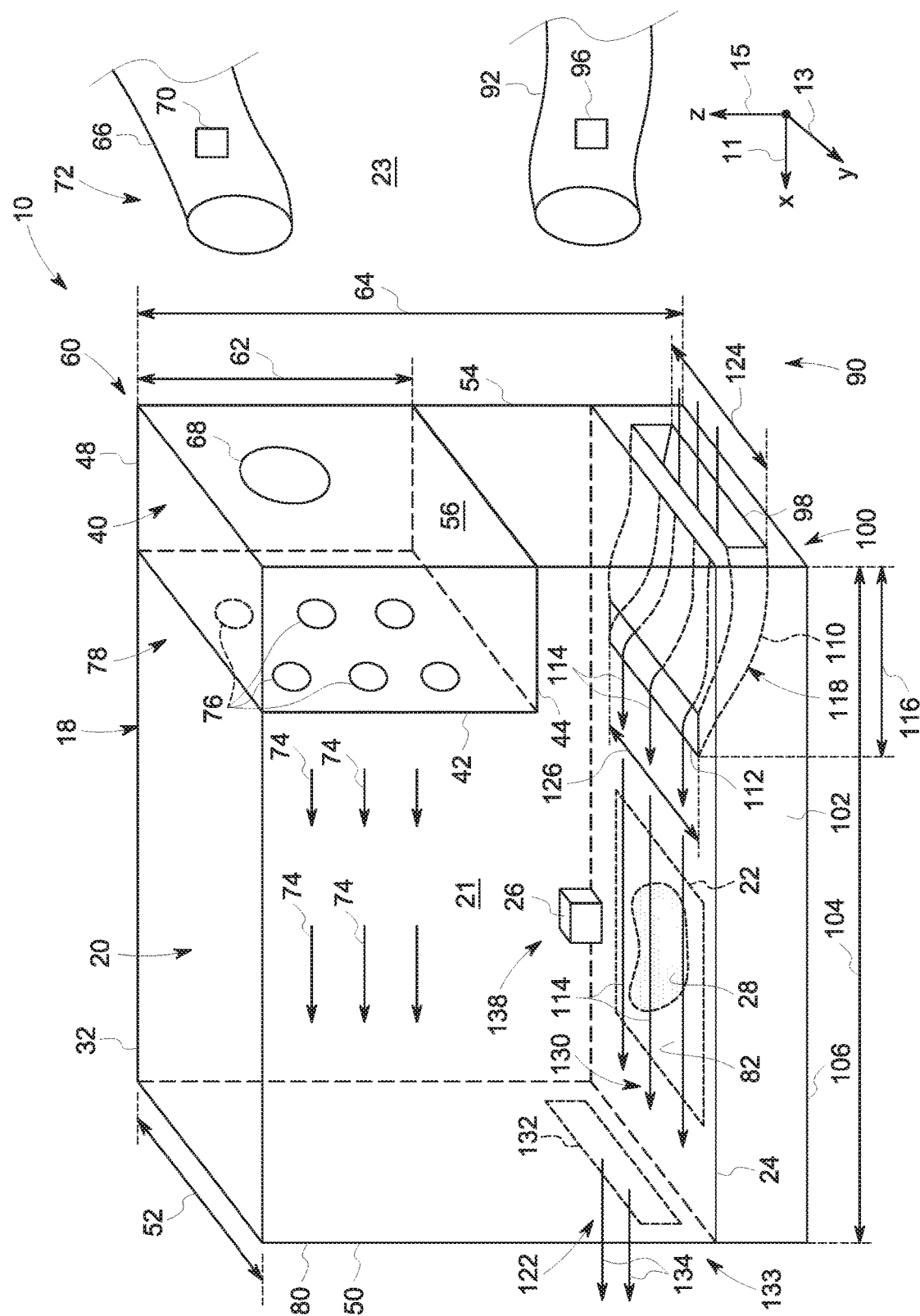
FIG. 2 is a schematic perspective view illustrating an embodiment of the manufacturing chamber of the AM system of FIG. 1 including an upper gas flow arrangement, as well as a lower gas flow arrangement having a contoured surface configured to guide the lower gas flow, in accordance with present embodiments.

FIG. 2 is a schematic perspective view illustrating an embodiment of the chamber 20 of the AM system 10, in accordance with the present approach. As illustrated, the AM system 10 includes a plenum 40 that is defined by a plenum side wall 42 and a plenum dividing wall 44, which each extend in the y-direction 13 from a side wall 48 to a side wall 50 of the housing 18, along an entire width 52 of the chamber 20. Accordingly, the plenum dividing wall 44 and the plenum side wall 42 enclose a portion of the interior volume 21 of the chamber 20 between a rear wall 54 and the top wall 32 of the chamber 20. The enclosed volume is separate from the remaining volume of the chamber 20, and will be referred to herein as a plenum chamber 56. In the illustrated embodiment, the plenum chamber 56 is disposed within an upper portion 60 of the chamber 20, which includes any portion, or portions of the chamber 20 disposed vertically above (e.g., with respect to the z-direction 15) the plenum dividing wall 44. For example, in some embodiments, a height 62 of the plenum 40 (e.g., a distance between the top wall 32 and the plenum dividing wall 44) may include 40%, 50%, 60%, or 70%, of a total height 64 of the chamber 20. Accordingly, the upper portion 60 of the chamber 20 may include an upper 40%, upper 50%, upper 60%, or an upper 70% of the chamber 20, depending on the vertical position of the plenum dividing wall 44 in different embodiments.

In the illustrated embodiment, the plenum chamber 56 is fluidly coupled to an upper gas delivery device 66 via an aperture 68 defined within the rear wall 54 of the housing 18. As shown in the illustrated embodiment, the aperture 68 is defined within a portion of the rear wall 54 that is vertically above the plenum dividing wall 44. The upper gas delivery device 66 may be coupled to a gas supply line or any other suitable gas source, which enables the upper gas delivery device 66 to supply a gas flow to the plenum chamber 56 and, in some cases, pressurize the plenum chamber 56 (e.g., with respect to an ambient pressure within the chamber 20). As described in greater detail herein, the upper gas delivery device 66 may include an upper flow generating device 70 that includes one or more suitable conveying devices such as one or more fluid valves, one or more pumps or blowers, or a combination thereof, which generate and/or regulate a flow rate and/or a pressure of the gas flow entering the plenum chamber 56. The upper gas delivery device 66, the upper flow generating device 70, and the plenum 40 collectively form an upper gas delivery system 72, which is configured to supply an upper gas flow 74 into the chamber 20.

For example, as illustrated, the plenum 40 includes a plurality of openings 76 defined within the plenum side wall 42, which collectively define an upper gas inlet 78 into the chamber 20. The plurality of openings 76 thus enable pressurized gas within the plenum chamber 56 to flow through the plenum side wall 42 and into the chamber 20. The plurality of openings 76 may include an array of openings that enable the upper gas flow 74 to flow substantially uniformly along the x-direction 11 (e.g., parallel to a top surface 82 of the build platform 22, perpendicular to the z-direction 15). The plurality of openings 76 may be sized to regulate certain flow characteristics of the upper gas flow 74, such as a flow distribution, a flow rate (e.g., a mass flow rate, a volumetric flow rate), a flow velocity (e.g., in meters per second (m/s)), a flow direction or angle, or any combination thereof. For example, in some embodiments, the plurality of openings 76 may be sized to facilitate substantially laminar flow of the upper gas flow 74 along the upper portion 60 of the chamber 20. In certain embodiments, the plurality of openings 76 may be in the form of circular holes, as illustrated in FIG. 2. However, in other embodiments, the plurality of openings 76 may be arranged and shaped in a honeycomb-like structure, a sponge-like structure, or any other suitable geometric arrangement to facilitate generating the desired flow characteristics of the upper gas flow 74. In yet further embodiments, the plurality of openings 76 may include a single opening that, for example, extends along a portion of the width 52, or substantially all of the width 52 of the chamber 20.

It should be noted that although the upper gas inlet 78 is defined within the plenum side wall 42 in the illustrated embodiment shown in FIG. 2, in other embodiments, the upper gas inlet 78 may be defined within any other suitable portion of the chamber 20 or portions of the chamber 20. For example, in some embodiments, the plurality of openings 76 is defined within the top wall 32, the side wall 48, the side wall 50, a front wall 80 of the housing 18, or a combination thereof, in addition to, or in lieu of, the plenum side wall 42. Accordingly, in certain embodiments, the upper gas inlet 78 may supply the upper gas flow 74 into the chamber 20 at an angle relative to the x-direction 11. In such embodiments, the AM system 10 may include one or more flow directing elements that are disposed within the chamber 20 and configured to receive the upper gas flow 74 from the plurality of openings 76 and redirect the upper gas flow 74 in a direction generally parallel to the x-direction 11. The flow directing elements may include one or more winglets, one or more airfoils, or any other suitable flow directing system configured (e.g., shaped oriented) to redirect a flow direction of the upper gas flow 74. In certain embodiments, the plenum 40 may be omitted from the AM system 10, such that the plurality of openings 76 is defined within the rear wall 54 of the housing 18, rather than the plenum side wall 42 of the plenum 40. In such embodiments, the upper gas delivery device 66 may be fluidly coupled directly to the plurality of openings 76, thereby enabling supply of the upper gas flow 74 through the plurality of openings 76. As described in greater detail herein, in yet further embodiments of the AM system 10, the upper gas delivery system 72 may be omitted from the AM system 10 entirely. In such embodiments, the AM system 10 does not include the upper gas flow 74.

The embodiment of the AM system 10 shown in FIG. 2 also includes a lower gas delivery system 90 having a lower gas delivery device 92 that includes a lower flow generating device 96. The lower flow generating device 96 may be disposed within the lower gas delivery device 92 and/or form a part of the lower gas delivery device 92. The lower flow generating device 96 includes any suitable conveying device or conveying devices (e.g., one or more fluid valves, one or more pumps or blowers, or a combination thereof) that generate and/or regulate a flow rate of a gas flow and/or a pressure of a gas flow supplied by a suitable gas source, such as the gas supply line. The lower gas delivery device 92 fluidly couples to a lower gas inlet 98 defined within the rear wall 54 of the chamber 20, proximate to an upstream end portion 100 of the chamber 20. The AM system 10 includes a base plate 102 that extends along a length 104 of the chamber 20. The base plate 102 is defined by the bottom wall 24 of the chamber 20 and a lower end portion 106 of the housing 18. A channel 110 is defined within the base plate 102 and fluidly couples the lower gas inlet 98 to a channel outlet 112 defined within the bottom wall 24. As shown in the illustrated embodiment, the channel 110 extends along a length 116 from the lower gas inlet 98 to the channel outlet 112. Accordingly, the lower gas inlet 98 may receive a lower gas flow 114 from the lower gas delivery device 92 and supply the lower gas flow 114 to the chamber 20.

The channel 110 is defined in part by a contoured surface 118 (e.g., a curved surface or an 's'-shaped surface) that extends tangentially between the lower gas inlet 98 and the bottom wall 24 adjacent the channel outlet 112. As described in greater detail herein, the contoured surface 118 is configured to induce a fluid guiding effect, such as the Coanda effect, in the lower gas flow 114, which facilitates discharging the lower gas flow 114 from the channel outlet 112 in the x-direction 11 (e.g., substantially parallel to the build platform 22, substantially parallel to the top surface 82 of the build platform 22), or in a direction substantially parallel to the x-direction 11 (e.g., in a direction±5 degrees with respect to the x-direction 11). As noted above, the Coanda effect is the tendency of a flow of fluid to adhere to an adjacent flat or curved surface. Accordingly, the Coanda effect causes the lower gas flow 114 to adhere to the contoured surface 118 and flow along a length of the contoured surface 118. However, the fluid guiding effect may also include any other guiding forces configured to redirect a flow trajectory of a fluid, such as static pressure differentials and/or dynamic pressure differentials along a length and/or a width of the fluid flow.

As shown in the illustrated embodiment, the lower gas inlet 98 is oriented cross-wise (e.g., perpendicular) to the channel outlet 112. For example, because the lower gas inlet 98 is defined within the rear wall 54, the lower gas inlet 98 is disposed within a plane formed by the y- and z-axes 13, 15. Accordingly, the lower gas inlet 98 is oriented parallel to the rear wall 54, such the lower gas inlet 98 is configured to receive the lower gas flow 114 in the x-direction 11. The channel outlet 112 is defined within the bottom wall 24, and thus, is disposed within a plane formed by the x- and y-axes 13, 15, and is oriented in the z-direction 15. As shown in the illustrated embodiment, the rear wall 54 extends perpendicular, or cross-wise to the bottom wall 24. Accordingly, the lower gas inlet 98 is oriented perpendicular to, or cross-wise to the channel outlet 112. The fluid guiding effect enables the lower gas flow 114 to flow along the contoured surface 118 (which extends tangentially from the lower gas inlet 98 to the bottom wall 24) and discharge from the channel outlet 112 in the x-direction 11, substantially parallel to the build platform 22, even though the channel outlet 112 is oriented in the z-direction 15 (e.g., a direction substantially perpendicular to the build platform 22). More specifically, the fluid guiding effect enables the lower gas flow 114 to follow a curvature of the contoured surface 118, and thus, discharge from the channel outlet 112 in a flow direction that is substantially parallel to the x-direction 11 (e.g., in a direction oriented±5 degrees with respect to the x-direction 11). It should be noted that in other embodiments, an angle between the rear wall 54 and the bottom wall 24 may be greater than, or less than 90 degrees. For example, an angle between the rear wall 54 and the bottom wall 24 may be between about 70 degrees and about 110 degrees. Accordingly, an angle between the lower gas inlet 98 and the channel outlet 112 may be between about 70 degrees and about 110 degrees depending on an orientation of the rear wall 54 relative to the bottom wall 24.

After discharging from the channel outlet 112, the lower gas flow 114 is directed along a lower portion 122 of the chamber 20 and flows across the build platform 22. For clarity, it should be noted that the lower portion 122 of the chamber 20 includes any portion of the chamber 20, or portions of the chamber 20 disposed vertically below (e.g., with respect the z-axis 15) the plenum dividing wall 44. For example, in some embodiments, the lower portion 122 may include a lower 50%, lower 40%, lower 30%, or a lower 20% of the chamber 20, depending on a position of the plenum dividing wall 44 with respect to the z-axis 15. Regardless, directing the lower gas flow 114 across the build platform 22 in a direction parallel to the build platform 22 (e.g., in the x-direction 11) may mitigate, or substantially eliminate undesirable interaction between the lower gas flow 114 and the powder bed 28 disposed on the build platform 22. For example, because the lower gas flow 114 is directed parallel across the build platform 22, rather than at an angle toward the build platform 22, the lower gas flow 114 may not disturb the powder bed 28 through vortices and/or pressure fluctuations that may be generated by the lower gas flow 114.

As shown in the illustrated embodiment of FIG. 2, the lower gas inlet 98 and the channel outlet 112 each include a generally rectangular shape that extends along a first width 124 and a second width 126, respectively. The first width 124 and the second width 126 may each include a portion of the width 52 of the chamber 20, or substantially all of the width 52 of the chamber 20 in different embodiments. While the first width 124 and the second width 126 are shown as equal in the illustrated embodiment, it should be noted that the first width 124 may be greater than, or less than the second width 126 in certain embodiments of the AM system 10. For example, in some embodiments, the first width 124 of the lower gas inlet 98 may be relatively small, while the second width 126 of the channel outlet 112 is relatively large. In such embodiments, a width of the channel 110 may diverge in a downstream direction (e.g., in the x-direction 11) from the lower gas inlet 98 to the channel outlet 112.

One or more flow directing elements, such as fins, air foils, or the like, may be disposed within the channel 110 and configured to facilitate even distribution of the lower gas flow 114 along the second width 126 of the channel outlet 112. Accordingly, the flow distribution elements may ensure that that a flow rate and/or a flow velocity of the lower gas flow 114 is substantially uniform across the width 52, or a designated portion of the width 52 of the chamber 20. Although the lower gas inlet 98 and the channel outlet 112 are each shown as a single opening that is generally rectangular in the illustrated embodiment, it should be noted that the lower gas inlet 98 and the channel outlet 112 may include any suitable quantity of separate openings. Moreover, the openings may each have a similar cross-sectional shape or a different cross-sectional shape in certain embodiments of the AM system 10. For example, the channel outlet 112 may include a plurality of individual openings that are configured to regulate certain flow parameters of the lower gas flow 114, similar to the plurality of openings 76 of the upper gas inlet 78 discussed above. The channel outlet 112 may include a plurality of circular openings, perforations, and/or slots, or a plurality of openings having any other suitable geometric shape, which extend along the second width 126 of the channel outlet 112.

In further embodiments, the channel 110 may include a plurality of individual channels that extend between a respective inlet of the lower gas inlet 98 and a respective outlet of the channel outlet 112. In other words, the channel 110 may include a plurality of fluidly independent channels disposed adjacent to one another that extend between the lower gas inlet 98 and the channel outlet 112. The plurality of channels may fluidly couple to the lower flow generating device 96 using a common manifold or distribution chamber. Accordingly, the lower flow generating device 96 may supply the lower gas flow 114 to each channel of the plurality of channels. In some embodiments, one or more flow regulating elements such as orifice plates, valves, or the like, may be used to facilitate generating a velocity gradient (e.g., a gradient in terms of flow velocity or flow rate) across the lower gas flow 114 (e.g., across the width 52 of the chamber 20). In such embodiments, each channel may be associated with a respective flow regulating element that is configured to enable a predetermined flow rate and/or a predetermined flow velocity of gas to enter that particular channel.

As a non-limiting example, flow regulating elements associated with channels disposed proximate to the side walls 48, 50 of the chamber 20 may be adjusted such that these channels supply the lower gas flow 114 into the chamber 20 at a first flow velocity and/or a first flow rate. Flow regulating elements associated with channels disposed proximate to a central portion 130 of the chamber 20 (e.g., a portion of the chamber 20 extending along the x-direction 11 near a midpoint of the width 52) may be adjusted such that these channels supply the lower gas flow 114 into the chamber 20 at a second flow velocity and/or a second flow rate. The first flow velocity and/or the first flow rate may be greater than or less that the second flow velocity and/or the second flow rate in different embodiments. Accordingly, for such embodiments, the flow regulating elements enable the AM system 10 to generate a velocity gradient across the lower gas flow 114 (e.g., along the width 52 of the chamber 20) using a single flow generating device, such as the lower flow generating device 96. In some embodiments, the AM system 10 may include a plurality of lower flow generating devices, where each lower flow generating device of the plurality of lower flow generating devices is coupled to a respective channel of the plurality of channels. Accordingly, each lower flow generating device may be configured to supply a predetermined flow rate and/or a predetermined flow velocity of the lower gas flow 114 to a particular channel of the plurality of channels. The plurality of lower flow generating devices may thus be used in addition to, or in lieu, of the flow regulating elements to generate the velocity gradient across the lower gas flow 114.

The AM system 10 also includes a gas outlet 132 disposed in a downstream end portion 133 of the chamber 20 for discharging a gas flow 134 from the chamber 20. The discharged gas flow 134 includes the upper gas flow 74, the lower gas flow 114, as well as a substantial portion of any smoke and/or particulate matter that is generated during the AM process. In the illustrated embodiment, the gas outlet 132 is arranged in the front wall 80 of the housing 18, opposing the rear wall 54. The gas outlet 132 may be arranged toward the lower portion 122 of the chamber 20, such that the lower gas flow 114 travels tangentially above the build platform 22 and through the gas outlet 132. However, in other embodiments, the gas outlet 132 may be disposed within the upper portion 60 of the chamber 20. While the gas outlet 132 is illustrated as being rectangular in shape in FIG. 2 for simplicity, the gas outlet 132 can be of any suitable shape (e.g., circular, polygon, oval) that enables sufficient discharging of the gas flow 134 in other embodiments.

In some embodiments, the gas outlet 132 may include a plurality of openings within the front wall 80 of the housing 18, which may be disposed near the upper portion 60 of the chamber 20, the lower portion 122 of the chamber 20, or both. The gas outlet 132 may be coupled to a suction mechanism to draw and discharge the gas flow 134 from the chamber 20. In some embodiments, the suction mechanism may also include a filtration system that is configured to filter the gas flow 134, for example, by removing any smoke and/or particulate matter suspended within the gas flow 134 that has been removed from the chamber 20. After filtration, the gas flow 134 may be directed toward the upper gas delivery device 66 and/or the lower gas delivery device 92 for reuse in the upper and lower gas delivery systems 72, 90. It should be noted that the upper and lower gas flows 74, 114 may include inert gases, such as argon or nitrogen, but may additionally include any other suitable gas configured to facilitate removal of the smoke and/or particulate matter generated during operation of the AM system 10 from the chamber 20.

As shown in the illustrated embodiment, the powder application device 26 is disposed near a rearward portion 138 of the chamber 20, proximate the side wall 48. Accordingly, interaction between the lower gas flow 114 and the powder application device 26 may be substantially reduced, thereby mitigating vortices that may be generated when the lower gas flow 114 impinges upon the powder application device 26. In some embodiments, the AM system 10 includes an additional chamber or compartment disposed adjacent the rearward portion 138 of the chamber 20, which receives and houses the powder application device 26 during inactive periods of the powder application device 26 (e.g., time periods during which the powder application device 26 does not deposit powder material onto the build platform 22). In such embodiments, the powder application device 26 is disposed laterally behind the side wall 48 (e.g., with respect to the y-direction 13) during such inactive periods, such that the powder application device 26 does not protrude into the interior volume 21 of the chamber 20. During a deposition period of the powder application device 26 (e.g., a time period during which the powder application device 26 deposits powder material onto the build platform 22), the powder application device 26 translates or extends out of the additional chamber and into the chamber 20 (e.g., via an aperture defined within the side wall 48). Accordingly, the powder application device 26 may successively deposits layers of the powder material onto the build platform 22. That is, the powder application device 26 translates along the y-direction 13 to deposit successive layers of the powder material. However, as noted above, the powder application 26 device may also traverse the chamber 20 in the x-direction 11, the z-direction 15, or a combination of the x-direction 11, the y-direction 13, and/or the z-direction 15, while depositing the powder material. Regardless, after the deposition period is complete, the powder application device 26 may return to the additional chamber, thus removing the powder application device 26 from the interior volume 21 of the chamber 20.

Figure 3:
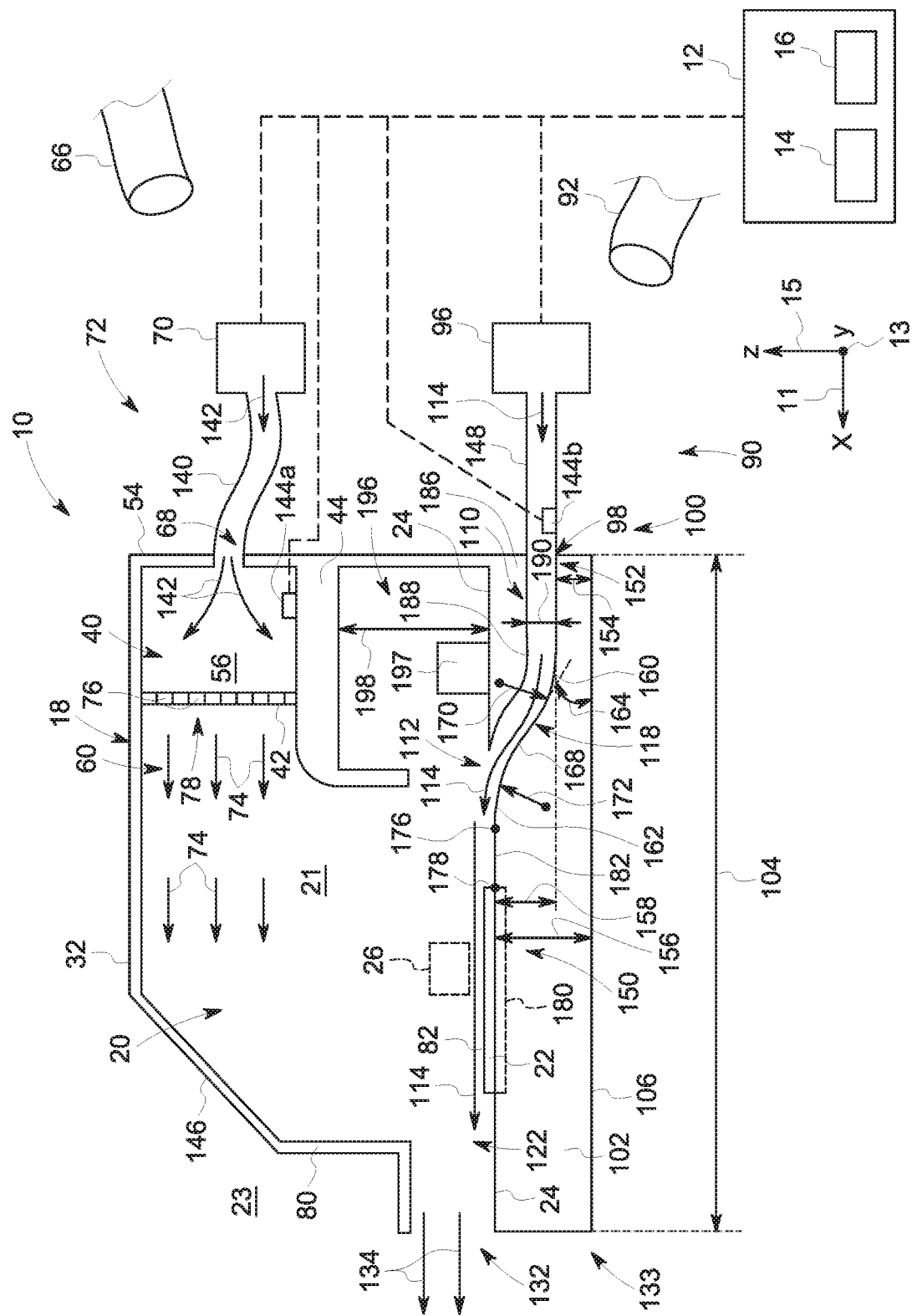
FIG. 3 is a schematic cross-sectional view illustrating an embodiment of the AM system of FIG. 2 having the lower gas flow arrangement that includes the contoured surface, in accordance with present embodiments.

FIG. 3 is a schematic cross-sectional view illustrating an embodiment of the chamber 20 of the AM system 10, in accordance with present embodiments. In the illustrated embodiment, an upper conduit 140 extends between the upper flow generating device 70 and the plenum 40, such that the upper flow generating device 70 may direct a gas 142 (e.g., a gas forming the upper gas flow 74) from the upper gas delivery device 66 to the plenum chamber 56 (e.g., through the aperture 68 disposed within the rear wall 54). In certain embodiments, the upper flow generating device 70 may modulate a flow rate of the gas 142 supplied to the plenum chamber 56 and/or a pressure of the gas 142 within the plenum chamber 56, which may affect certain flow characteristics of the upper gas flow 74. Accordingly, the upper flow generating device 70 may be used to adjust the flow characteristics of the upper gas flow 74 in addition to, or in lieu of, the plurality of openings 76.

For example, a target pressure of the gas 142 within the plenum chamber 56 may correspond to a predetermined flow rate and/or a predetermined flow velocity of the upper gas flow 74. Accordingly, the target pressure within the plenum chamber 56 may be adjusted to achieve a desired flow rate and/or a desired flow velocity of the upper gas flow 74. A magnitude of the target pressure corresponding to the desired flow rate and/or the desired flow velocity of the upper gas flow 74 may be previously determined using computer modeling simulations (e.g., via computational fluid dynamics software) and/or empirical tests. For the illustrated embodiment, AM system 10 includes one or more sensors 144 (e.g., sensors 144a, sensors 144b) configured to measure various operational parameters of the AM system 10. For example, as illustrated, the plenum 40 includes the sensors 144a disposed within the plenum chamber 56, which are configured to measure parameters indicative of a pressure of the gas 142. The sensors 144a may include pressure transducers, pressure gauges, or any other suitable pressure measuring instruments. The upper flow generating device 70 and the sensors 144a are communicatively coupled to the controller 12 via one or more control transfer devices, such as wires, cables, wireless communication devices, and the like. Accordingly, the controller 12 may receive feedback from the sensors 144a indicative of an actual pressure of the gas 142. In some embodiments, the controller 12 compares the actual pressure to the target pressure (e.g., a target pressure previously stored in the memory circuitry 14) and instructs the upper flow generating device 70 to increase or decrease a flow rate of the gas 142 delivered to the plenum chamber 56 (e.g., by increasing or decreasing an operational speed of the upper flow generating device 70) when the actual pressure deviates from the target pressure by a threshold amount. The controller 12 may thus ensure that a flowrate and/or a flow velocity of the upper gas flow 74 discharging from the plurality of openings 76 remains substantially similar to a target flow rate and/or a target flow velocity of the upper gas flow 74. For example, in some embodiments, the target flow rate may be between about 20 and 1200 cubic meters per minute ($m^3$/min), between about 80 $m^3$/min and 800 $m^3$/min, or between about 200 $m^3$/min and 400 $m^3$/min, and the target flow velocity may be between 0.1 meters per second (m/s) and about 10 m/s, between about 2 m/s and about 8 m/s, or between about 3 m/s and about 5 m/s.

It should be noted that the sensors 144a are not limited to pressure sensors, but may include any suitable types of sensors or sensors arrays that enable the controller 12 to monitor and adjust flow characteristics of the upper gas flow 74. For example, the sensors 144a may additionally or alternatively include flow rate sensors, temperature sensors, mass flow sensors, or any other suitable sensors configured to provide the controller 12 with feedback indicative of flow characteristics of the upper gas flow 74. In certain embodiments, the sensors 144a may be disposed externally with respect to the plenum chamber 56, such as within the chamber 20, near the plurality of openings 76, or within a suitable portion of the upper gas delivery device 66. The controller 12 may use the feedback acquired by the sensors 144a in accordance with the techniques discussed above to control operation of the upper flow generating device 70. In addition, it should be noted that while the illustrated embodiment of FIG. 3 shows a single flow generating device (e.g., the upper flow generating device 70) fluidly coupled to the plenum chamber 56, the AM system 10 may include two or more flow generating devices that are each configured to facilitate the flow of gas 142 from the upper gas delivery device 66 into the plenum chamber 56 of the plenum 40.

In certain embodiments, the housing 18 of the AM system 10 includes a chamfered portion 146 that extends between the top wall 32 and the front wall 80. The chamfered portion 146 may facilitate directing the upper gas flow 74 toward the lower portion 122 of the chamber 20 (e.g., after the upper gas flow 74 flows across the build platform 22), such that the upper gas flow 74 may be exhausted through the gas outlet 132 of the chamber 20. Accordingly, the chamfered portion 146 may mitigate the generation of vortices in the upper gas flow 74 and/or a recirculation of the upper gas flow 74 within the chamber 20, which may occur if the upper gas flow 74 impinges directly onto the front wall 80. Although the chamfered portion 146 is shown as a linear section of the housing 18 in the illustrated embodiment, it should be noted that the chamfered portion 146 may include a sloped profile or a curved profile that extends between the top wall 32 and the front wall 80 in other embodiments of the AM system 10. Further, it should be noted that an angle between the chamfered portion 146 and the front wall 80 (or an angle between the chamfered portion 146 and the top wall 32) may be greater than 45 degrees (°) or less than 45° in certain embodiments of the AM system 10.

The AM system 10 also includes a lower conduit 148 that fluidly couples the lower flow generating device 96 to the lower gas inlet 98. As described in greater detail herein, the lower flow generating device 96 may adjust certain flow parameters of the lower gas flow 114 to facilitate directing the lower gas flow 114 across the build platform 22 of the AM system 10. It should be noted that upper flow generating device 70 and the lower flow generating device 96 may include a common flow generating device in certain embodiments of the AM system 10, which is configured to supply gas to both the plenum chamber 56 and the lower gas inlet 84. In such embodiments, one or more flow regulating elements (e.g., orifice plates, valves, baffles, louvers, etc.) may be used to direct gas to the plenum chamber 56 and the lower gas inlet 98 at respective target flow rates. Accordingly, the gas supplied by the common gas flow generating device may be used to generate both the upper gas flow 74 and the lower gas flow 114. As noted above, in certain embodiments, the AM system 10 does not include the upper gas delivery system 72. Accordingly, in such embodiments, the AM system 10 includes only the lower flow generating device 96, or a plurality of lower flow generating devices, which are associated with the lower gas inlet 98.

As shown in the illustrated embodiment, the build platform 22 is disposed at a first elevation 150 with respect to the chamber 20, while the lower gas inlet 98 is disposed at a second elevation 152 with respect to the chamber 20. The lower gas inlet 98 is disposed below the build platform 22 (e.g., with respect to a position along the z-axis 15), such that the second elevation 152 of the lower gas inlet 98 is less than the first elevation 150 of the build platform 22. In other words, a distance 154 between the lower end portion 106 of the housing 18 and the lower gas inlet 98 is less than a distance 156 between the lower end portion 106 and the build platform 22 in the illustrated embodiment of FIG. 3. Therefore, the lower gas inlet 98 is below the build platform 22 by a distance 158. The contoured surface 118 of the channel 110 is configured to receive the lower gas flow 114 at the second elevation 152 (at the lower gas inlet 98), and discharge the lower gas flow 114 at the first elevation 150 (at the build platform 22).

For example, the contoured surface 118 includes a concave portion 160 disposed downstream (e.g., with respect to a flow direction of the lower gas flow 114) of the lower gas inlet 98, which is followed by a convex portion 162 disposed downstream of the concave portion 160. The concave portion 160 is configured to receive the lower gas flow 114 in the x-direction 11 from the lower gas inlet 98. The concave portion 160 redirects the lower gas flow 114 in an intermediate direction, at an angle 164 relative to the lower end portion 106 of the housing 18 and the build platform 22. In some embodiments, the angle 164 may be between about 2 degrees (°) and about 50°, between about 15° and about 35° (e.g., ±5°). The contoured surface 118 may include an intermediate portion 168 that is linear and extends tangentially between the concave portion 160 and the convex portion 162 at the angle 164. Accordingly, the lower gas flow 114 is directed along the intermediate portion 168 from the second elevation 152 toward the first elevation 150. As shown in the illustrated embodiment, the convex portion 162 extends tangentially between the intermediate portion 168 and the build platform 22. The fluid guiding effect causes the lower gas flow 114 to follow a profile of the convex portion 162, such that the lower gas flow 114 is redirected from the intermediate direction to the x-direction 11. The lower gas flow 114 thus discharges from the contoured surface 118 in the x-direction 11 and flows toward the build platform 22.

In some embodiments, a radius of curvature 170 of the concave portion 160 and a radius of curvature 172 of the convex portion 162 are constant. For example, the radius of curvature 170 of the concave portion 160 and the radius of curvature 172 of the convex portion 172 may include a percentage of the width 52 of the chamber 20, a percentage of the height 64 of the chamber 20, a percentage of the length 104 of the chamber 20, or a percentage of any other suitable dimension of the AM system 10. For example, the radius of curvatures 170, 172 may include between about 0.5% and about 200% of the length 104 of the chamber 20, between about 60% and about 2% of the length 104 of the chamber 20, between about 50% and about 10% of the length 104 of the chamber 20, or between about 35% and about 25% of the length 104 of the chamber 20. As a non-limiting example, in some embodiments, the radius of curvature 170 of the concave portion 160 and the radius of curvature 172 of the convex portion 162 may each be between about 0.2 centimeters (cm) and about 20 cm, between about 2 cm and about 10 cm, or about 5 cm. It should be noted that in certain embodiments, the radius of curvature 170 of the concave portion 160 may be greater than, or less than the radius of curvature 172 of the convex portion 162. For example, the radius of curvature 172 of the convex portion 162 may be relatively large (e.g., larger than the radius of curvature 170 at the concave portion 160), which may facilitate directing the lower gas flow 114 along the convex portion 162 via the fluid guiding effect. In yet further embodiments, a radius of curvature of the concave portion 160, the convex portion 162, or both, may be nonlinear, such that a slope of the concave portion 160 and/or a slope of the convex portion 162 changes along the length of the contoured surface 118. In general, the contoured surface 118 is configured to receive the lower gas flow 114 in the x-direction 11 and at the second elevation 152, direct the lower gas flow 114 in the intermediate direction, and utilize the fluid guiding effect to redirect the lower gas flow 114 from the intermediate direction to the x-direction 11. Accordingly, the lower gas flow 114 may discharge from the contoured surface 118 at the first elevation 150.

As noted above, the contoured surface 118 may extend the entire distance between the lower gas inlet 98 and the build platform 22 in certain embodiments of the AM system 10. In such embodiments, a downstream end portion 176 of the contoured surface 118 may abut an upstream end portion 178 of the build platform 22. It should be noted that a height of the build platform 22 may be negligible, such that an elevation of the downstream end portion 176 of the contoured surface 118 is substantially equal to an elevation (e.g., the first elevation 150) of the top surface 82 of the build platform 22. Accordingly, the lower gas flow 114 may discharge from the convex portion 162 and flow across the build platform 22 with no substantial hindrance. In other embodiments, the build platform 22 may be disposed in a flush position 180, in which the build platform 22 is embedded within or inserted into the base plate 102. In such embodiments, an elevation of the top surface 82 of the build platform 22 is equal to an elevation of downstream end portion 176 of the contoured surface 118. Accordingly, both the downstream end portion 176 of the contoured surface 118 and the upstream end portion 178 of the build platform 22 are disposed at the first elevation 150. In any case, the contoured surface 118 extends from the second elevation 152 of the lower gas inlet 98 to the first elevation 150 of the build platform 22, and thus enables the lower gas flow 114 to flow from the lower gas inlet 98 toward the build platform 22.

In certain embodiments, the contoured surface 118 does not extend the entire distance to the build platform 22. In such embodiments, a portion of the bottom wall 24 is disposed between the downstream end portion 176 of the contoured surface 118 and the upstream end portion 178 of the build platform 22. This portion of the bottom wall 24 will be referred to herein as a spacing portion 182, which extends parallel to the x-direction 11. The spacing portion 182 increases a separation distance between the channel outlet 112 and the powder material disposed on the build platform 22. Accordingly, the spacing portion 182 may reduce, or substantially eliminate a likelihood of powder material, or other foreign matter generated during the AM process entering the channel outlet 112 during operation of the AM system 10. The spacing portion 182 thus mitigates the aggregation of powder material and/or other foreign matter within the channel 110 and on the contoured surface 118. In some embodiments, a length of the spacing portion may be between 0.5 centimeters (cm) and about 3 cm, between about 3 cm and about 10 cm, or greater than 10 cm. As noted above, the powder application device 26 may traverse the chamber 20 in the y-direction 13 to deposit powder material onto the build platform 22. That is, the powder application device 26 travels generally parallel to the second width 126 (as shown in FIG. 2) of the channel outlet 112. This configuration may additionally mitigate undesirable powder deposition within the channel 110, as the powered application device 26 does not traverse across the channel outlet 112 during each deposition period for such embodiments.

As shown in the illustrated embodiment, the AM system 10 includes an intermediate wall 186 that forms an upper portion of the channel 110. The intermediate wall 186 is defined by a portion of the bottom wall 24, a portion of the rear wall 54, and an additional contoured surface 188 that extends between these two portions. In some embodiments, the additional contoured surface 188 is offset from the contoured surface 118 by a predetermined offset distance. Accordingly, a height 190 (e.g., a distance between the contoured surface 118 and the additional contoured surface 188) and a profile of the channel 110 may remain substantially equal along the length of the channel 110. In some embodiments, the offset distance may be between about 1 cm and 2 cm. However, in other embodiments, the offset distance may be greater than or less than 5 cm. In yet further embodiments, the height 190 of the channel 110 may be non-uniform, such that the channel 110 converges or diverges (e.g., with respect to the z-axis 15) from the lower gas inlet 98 to the channel outlet 112. As a non-limiting example, a height of the channel 110 near the channel outlet 112 may be approximately one half, one third, or one quarter of the height 190 of the channel 110 proximate the lower gas inlet 98. Accordingly, the dimensions of the channel 110 may be used to adjust certain flow parameters of the lower gas flow 114 in addition to, or in lieu of, the lower flow generating device 96. For example, decreasing the height 190 of the channel 110 near the channel outlet 112 may increase a flow velocity and a pressure of the lower gas flow 114 discharging from the channel 110. Conversely, increasing the height 190 of the channel 110 near the channel outlet 112 may decrease the flow velocity and the pressure of the lower gas flow 114 discharging from the channel 110. Accordingly, the height 190 of the channel 110 may be adjusted to achieve desired flow characteristics of the lower gas flow 114 and/or strengthen the fluid guiding effect near the channel outlet 112 (e.g., across the convex portion 162 of the contoured surface 118). The additional contoured surface 188 may thus facilitate guiding the lower gas flow 114 from the lower gas inlet 98 to the channel outlet 112.

In some embodiments, the additional contoured surface 188 may induce an additional fluid guiding effect that is configured to guide the lower gas flow 114 in addition to, or in lieu of, the fluid guiding effect generated by the contoured surface 118. For example, the additional contoured surface 188 may induce the Coanda effect, or any other fluid dynamics effect (e.g., fluidic pressure fluctuations) that facilitates guiding the lower gas flow 114 from the second elevation 152 to the first elevation 150. In further embodiments, the contoured surface 118 and the additional contoured surface 188 may cooperate similar to a pair of cascaded airfoils to direct the lower gas flow 114 along a particular flow trajectory.

Advantageously, integrating the lower gas inlet 98 and the channel 110 within the base plate 102 of the housing 18 may reduce a volume of space occupied by the lower gas delivery system 90 within certain portions of the chamber 20, such as a tooling area 196 disposed beneath the plenum 40. For example, because the lower gas inlet 98 is disposed below the build platform 22 and the bottom wall 24 of the chamber 20 (e.g., at the second elevation 152), tools 197 of the AM system 10 and/or other operational equipment of the AM system 10, such as one or more replacement build platforms, may occupy substantially all of a height 198 of the tooling area 196, without interfering with the lower gas delivery system 90. Moreover, because the tools 197 are disposed upstream (e.g., with respect to a flow direction of the lower gas flow 114) of the channel outlet 112, the tools 197 do not obstruct a flow path of the lower gas flow 114. Accordingly, fluidic turbulences within the lower gas flow 114 may be mitigated, or substantially eliminated, such that the lower gas flow 114 may flow across the build platform 22 at a substantially uniform flow rate and/or a substantially uniform flow velocity. In addition, integrating the channel outlet 112 within the bottom wall 24 of the chamber 20 allows the bottom wall 24 to remain substantially flat (e.g., parallel to the x-direction 11) along the length 104 of the chamber 20. Therefore, the tools 197 of the AM system 10 may traverse laterally along the length 104 of the bottom wall 24 of the chamber 20 without obstruction by the lower gas delivery system 90.

Figure 4:
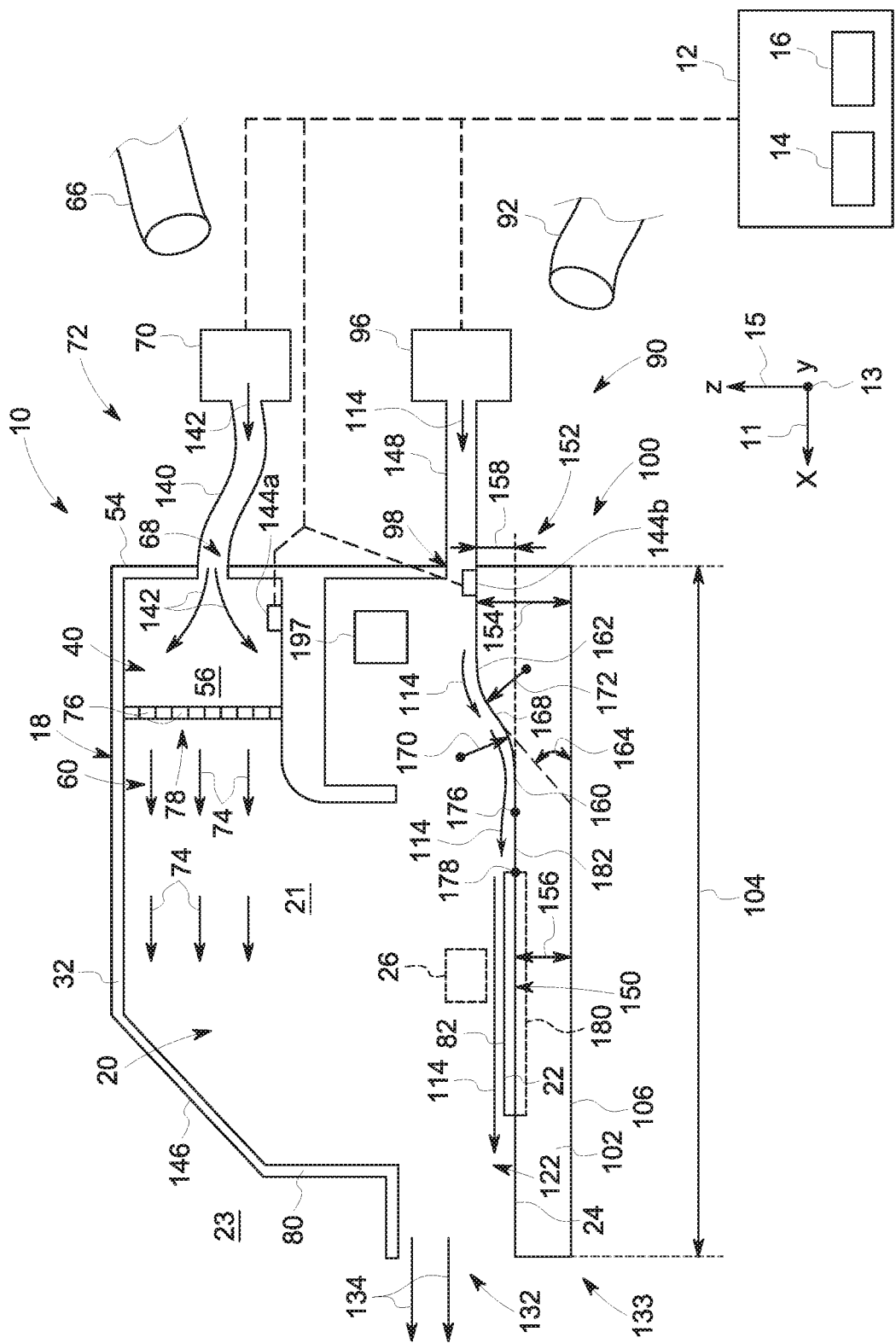
FIG. 4 is a schematic cross-sectional view illustrating an embodiment of the AM system of FIG. 2 having the lower gas flow arrangement that includes the contoured surface, in accordance with present embodiments.

It should be noted that the intermediate wall 186 may be omitted in certain embodiments of the AM system 10. In such embodiments, the AM system 10 does not include the channel 110, but rather, includes only the contoured surface 118 that extends between the lower gas inlet 98 and the build platform 22. In other words, the intermediate wall 186 does not form a channel (e.g., the channel 110) between the contoured surface 118 and a surface of the intermediate wall 186 (e.g., the additional contoured surface 188). In further embodiments, the lower gas inlet 98 may be disposed above, rather than below the build platform 22. For example, as shown in the embodiment of the AM system 10 illustrated in FIG. 4, the lower gas inlet 98 may be disposed vertically above (e.g., with respect to the z-axis 15) the build platform 22. Accordingly, the first elevation 150 of the build platform 22 is less than the second elevation 152 of the lower gas inlet 98. In other words, the lower gas inlet 98 is disposed above the build platform 22 by the distance 158. In such embodiments, the convex portion 162 of the contoured surface 118 is disposed upstream of the concave portion 160 of the contoured surface 118. As discussed above, the fluid guiding effect causes the lower gas flow 114 to adhere to a profile of the convex portion 192 while the lower gas flow 114 is directed across the contoured surface 118. Accordingly, the convex portion 162 redirects the lower gas flow 114 entering the chamber 20 in the x-direction 11 (e.g., via the lower gas inlet 98) to an intermediate direction (e.g., a direction toward the build platform 22). The lower gas flow 114 is subsequently directed along the intermediate portion 168 of the contoured surface 118 toward the bottom wall 24 of the chamber 20, and is then redirected from the intermediate direction to the x-direction 11 via the concave portion 160. Accordingly, the lower gas flow 114 discharges from the concave portion 160 at an elevation substantially equal to the first elevation 150 of the build platform 22 and flows across the build platform 22 in the x-direction 11.

Returning now to FIG. 3, in some embodiments, the controller 12 is communicatively and operatively coupled to the lower flow generating device 96 and may be configured to instruct the lower flow generating device 96 to maintain a desired flow rate and/or a desired flow velocity of the lower gas flow 114 during operation of the AM system. In some embodiments, the desired flow rate and/or the desired flow velocity are previously determined and correspond a flow rate and/or a flow velocity of the lower gas flow 114 that enhances an influence of the fluid guiding effect. Accordingly, the controller 12 may ensure that the lower gas flow 114 is guided along the convex portion 162 during operation of the AM system 10, and thus, mitigate a likelihood of flow separation between the lower gas flow 114 and the convex portion 162. For example, computer simulation tools (e.g., computation fluid dynamics software) and/or empirical trials may be used to determine a target flow rate of the lower gas flow 114 and/or a target flow velocity of the lower gas flow 114 at which the fluid guiding effect is enhanced (e.g., a flow rate and/or a flow velocity at which substantially all of the lower gas flow 114 is redirected by the convex portion 162 of the contoured surface 118). This target flow rate and target flow velocity may be stored in the memory circuitry 14 of the controller 12. In some embodiments, the target flow rate may be between about 20 and 2000 cubic meters per minute ($m^3$/min), between about 80 $m^3$/min and 800 $m^3$/min, or between about 300 $m^3$/min and 400 $m^3$/min, and the target flow velocity may be between 0.1 meters per second (m/s) and about 15 m/s, between about 2 m/s and about 10 m/s, or between about 3m/s and about 8 m/s. The controller 12 may monitor an actual flow rate and/or an actual flow velocity of the lower gas flow 114 during operation of the AM system 10 using the sensors 144b, and may adjust an operational speed of the lower flow generating device 96 such that the actual flow rate and/or the actual flow velocity of the lower gas flow 114 is maintained within a tolerance of the target flow rate and/or the target flow velocity.

For example, the sensors 144b may be disposed within a portion of the lower gas delivery device 92, the lower conduit 148, the channel 110, or any other suitable portion of the AM system 10. The sensor 200 may include a flow rate sensor, a flow velocity monitor, mass flow sensor, or any other suitable sensor configured to provide the controller 12 with feedback indicative of an actual flow rate and/or an actual flow velocity of the lower gas flow 114. For example, in certain embodiments, if the actual flow rate and/or the actual flow velocity of the lower gas flow 114 deviates from the target flow rate and/or the target flow velocity by a more than a predetermined threshold amount, the controller 12 instructs the lower flow generating device 96 to increase or decrease a flow rate and/or a flow velocity of the lower gas flow 114 (e.g., by increasing or decreasing the operational speed of the lower flow generating device 96), such that the actual flow rate and/or the actual flow velocity of the lower gas flow 114 approaches the target flow rate and the target flow velocity, respectively.

In some embodiments, the controller 12 adjusts a flow rate and/or a flow velocity of the lower gas flow 114 based on thermodynamic properties of the lower gas flow 114, based on a composition of the lower gas flow 114, or both. For example, a surface temperature of the contoured surface 118, a temperature of the lower gas flow 114, and/or a composition of the lower gas flow 114 may affect a target flow rate and/or a target flow velocity of the lower gas flow 114 at which the fluid guiding effect is strengthened. Similar to the discussion above, computer simulation tools, empirical trials, or both may be used to determine a correlation between the thermodynamic properties and the compositional properties of the lower gas flow 114 and a stability of the fluid guiding effect (e.g., an ability of the lower gas flow 114 to adhere to the convex portion 162). Correlations between the thermodynamic and compositional properties of the lower gas flow 114 and the corresponding target flow rate and target flow velocity of the lower gas flow 114 may be stored in the memory circuitry 14 (e.g., as equations, look-up tables, etc.).

Similar to the discussion above, the controller 12 may monitor the thermodynamic and compositional properties of the lower gas flow 114 during operation of the AM system 10 via the sensors 144b to determine whether adjustments in the flow rate and/or the flow velocity of the lower gas flow 114 are desired. For example, the sensors 144b may further include, but are not limited to, temperature sensors, such as such a thermocouples, resistance temperature detectors, or thermistors, and gas detector sensors, such as electrochemical sensors, ultrasonic sensors, or particulate/smoke sensors. The controller 12 may compare whether an actual flow rate and/or an actual flow velocity of the lower gas flow 114 corresponds to the respective target values of the flow rate and/or the flow velocity that are associated with the measured thermodynamic and compositional properties of the lower gas flow 114. If the actual flow rate and/or the actual flow velocity of the lower gas flow 114 deviates from the target flow rate and/or the target flow velocity, the controller 12 instructs the lower flow generating device 96 to increase or decrease a flow rate and/or a flow velocity of the lower gas flow 114, such that the actual flow rate and/or the actual flow velocity of the lower gas flow 114 approaches the target value(s). Accordingly, the controller 12 may ensure that the fluid guiding effect within the lower gas flow 114 is preserved during operation of the AM system 10. Additionally or otherwise, the controller 12 may adjust the flow rate and/or the flow velocity of the lower gas flow 114, the upper gas flow 74, or both, using feedback generated by the sensors 144b indicative of any suitable operating parameter of the AM system 10.

Figure 5:
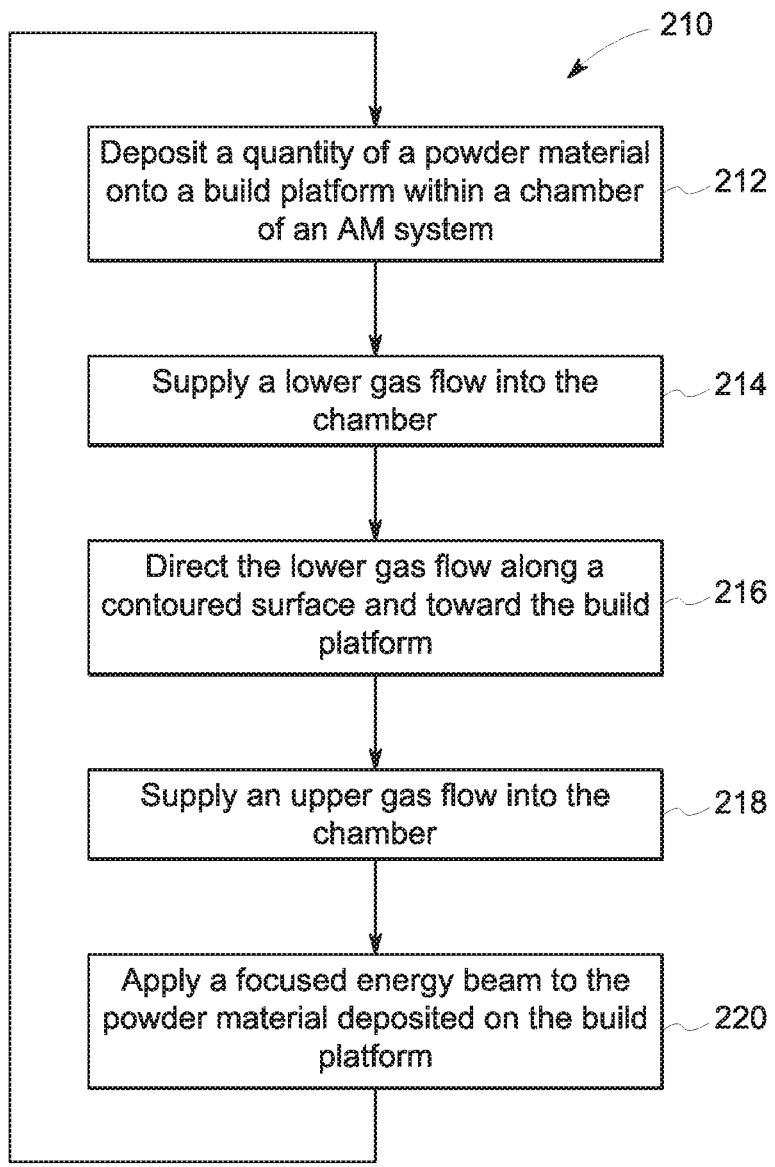
FIG. 5 is a flow chart of an embodiment of a process for operating the AM system of FIG. 2, in accordance with present embodiments.

With the foregoing in mind, FIG. 5 is a flow chart of an embodiment of a process 210 whereby the AM system 10 may be operated during fabrication of an article. The following discussion references element numbers used throughout FIGS. 1-4. It should be noted that one or more of the steps of the process 210 may be stored in the memory circuitry 14 and executed by the processing circuitry 16 of the controller 12. For the embodiment illustrated in FIG. 5, the process 210 begins with depositing (step 212) a quantity of a powder material onto the build platform 22 within the chamber 20 of the AM system 10. For example, the controller 12 instructs the powder application device 26 to deposit the powder material onto the build platform 22. The controller 12 instructs the positioning system 36 to move the powder application device 26 and/or the build platform 22 to any suitable positions relative to one another along the x-, y-, and z-axis 11, 13, 15, or a combination thereof, to deposit the powder material in a layer-by-layer manner during each deposition period of the powder application device 26.

The illustrated embodiment of the process 210 continues with supplying (step 214) the lower gas flow 114 into the chamber 20. For example, the controller 12 instructs the associated gas delivery system (e.g., the lower gas delivery system 90) to supply the lower gas flow 114 into the chamber 20 (e.g., via the lower gas inlet 98). By way of specific example, the controller 12 instructs the lower gas delivery system 90 to control the flow characteristics of the lower gas flow 114, such as flow distribution, flow rate (e.g., mass flow rate, volume flow rate), flow temperature, or any combination thereof. The method includes directing (step 216) the lower gas flow 114 along the contoured surface 118 from the second elevation 152 of the lower gas inlet 98 to the first elevation 150 of the build platform 22. For example, as discussed above, the contoured surface 118 is configured (e.g., shaped, arranged) to induce the fluid guiding effect, such that the convex portion 162 of the contoured surface 118 may be used together with the concave portion 160 to adjust a flow direction of the lower gas flow 114. Accordingly, the convex portion 162 and the concave portion 160 of the contoured surface 118 may cooperate to direct the lower gas flow 114 from the second elevation 152 to the first elevation 150. In some embodiments, the controller 12 may adjust a flow rate of the lower gas flow 114 (e.g., via the lower flow generating device 96), such that an actual flow rate of the lower gas flow 114 is substantially equal to a target flow rate that is favorable to generate of the fluid guiding effect. For example, if the actual flow rate of the lower gas flow 114 exceeds or falls below the target flow rate by a threshold amount, the fluid guiding effect may not sufficiently guide the lower gas flow 114 along a curvature of the convex portion 162, such that the lower gas flow 114 turbulently discharges into the chamber 20 and does not traverse substantially parallel to the build platform 22. Accordingly, the controller 12 may ensure that the fluid guiding effect is preserved during the desired portion of the operation of the AM system 10 by maintaining the actual flow rate of the lower gas flow 114 substantially similar to the target flow rate. In certain embodiments, the controller 12 also instructs the lower gas delivery system 90 to control content (e.g., argon, nitrogen, any other suitable inert gas, or a combination thereof) of the lower gas flow 114.

In the illustrated embodiment, the process 210 includes supplying (step 218) an upper gas flow into the chamber 20. For example, the controller 12 instructs the associated gas delivery system (e.g., the upper gas delivery system 72) to supply the upper gas flow 74 into the chamber 20. By way of specific example, the controller 12 instructs the upper gas delivery system 72 to control the flow characteristics of the upper gas flow 74, such as flow distribution, flow rate (e.g., mass flow rate, volume flow rate), flow temperature, or any combination thereof. In certain embodiments, the controller 12 instructs the upper gas delivery system 72 to control content (e.g., argon, nitrogen, any other suitable inert gas, or a combination thereof) of the upper gas flow 74. As noted above, certain embodiments of the AM system 10 do not include the upper gas delivery system 72. Accordingly, in such embodiments, the process 210 does not include the step 218.

In some embodiments, the controller 12 may instruct the upper and lower gas delivery systems 72, 90 to control the flow velocities of the upper gas flow 74 and the lower gas flow 114, such that a ratio between the two gas flow velocities is controlled at a desirable value or range. For example in some embodiments, the flow velocity of the lower gas flow 114 is in a range between about 10 times and about 1.5 times the flow velocity of the upper gas flow 74, between about 9 times and about 7 times the flow velocity of the upper gas flow 74, or about 8 times the flow velocity of the upper gas flow 74. In certain embodiments, the ratio between the lower gas flow 114 and the upper gas flow 74 may be tuned to facilitate evacuating smoke and/or particulate matter from the chamber 20 via the gas outlet 132.

The illustrated embodiment of the process 210 includes selectively applying (step 220) a focused energy beam to the quantity of a powder material deposited on the build platform 22. For example, the controller 12 instructs the energy generating system 30 to apply the focused energy beam 31, such as a laser beam, to portions of the powder bed 28. The focused energy beam 31 selectively melts and/or sinters the powder material of the powder bed 28 in a predefined manner to form a solidified layer while the upper and/or lower gas flows 74, 114 are supplied.

In some embodiments, the supplying the lower gas flow 114 in the step 214, directing the lower gas flow 114 along the contoured surface 118 in the step 216, and supplying the upper gas flow 74 in the step 218 may be performed simultaneously. In some embodiments, supplying the lower gas flow 114 in the step 214 and directing the lower gas flow 114 along the contoured surface 118 in the step 216 may be performed before or after supplying the upper gas flow 74 in the step 218. In some embodiments, the applying the focused energy beam 31 in the step 220 may be performed simultaneously to supplying the lower gas flow 114 and directing the lower gas flow 114 along the contoured surface 118 in the steps 214 and 216, and supplying the upper gas flow 74 in the step 218. In some embodiments, applying the focused energy beam 31 in the step 220 may be performed before supplying the lower gas flow 114 and directing the lower gas flow 114 along the contoured surface 118 in the steps 214 and 216 or before supplying the upper gas flow 74 in the step 218. In some embodiments, the process 210 may repeat the steps 212, 214, 216, 218, and 220 to form additional solidified layer on the previously formed solidified layer. In some embodiments, the process 210 may include performing the steps 214, 216, and 218 every time after performing the step 220. In some embodiments, the process 210 may include repeating the steps 212, 214, 216, 218, and 220 multiple times to form successive additional solidified layers to form the desired article (e.g., applying the focused energy beam 31 in the step 220 is continuously performed while supplying the lower gas flow 114 in the step 214, directing the lower gas flow along the contoured surface 118 in the step 216, and supplying the upper gas flow 74 in the step 218).

The technical effects of the present disclosure include improving the performance and efficiency of an AM system by removing from the chamber smoke and/or other particulate matter generated during the AM process. The disclosed AM system employs a combination of an upper gas flow that is supplied from a side wall in the upper portion of the chamber and is directed substantially parallel to a build platform, and a lower gas flow that is supplied from below or above the build platform and is directed toward the build platform via a contoured surface. The contoured surface is configured to utilize the fluid guiding effect to direct the lower gas flow from a lower gas inlet to the build platform, such that the lower gas flow is directed across the build platform in a direction substantially parallel to the build platform. Introducing the lower gas flow into the chamber via the contoured surface may mitigate an amount of space occupied by a lower gas delivery system within the chamber. Accordingly, an amount of usable volume within the chamber of the AM system is enhanced. Moreover, directing the lower gas flow substantially parallel to the build platform may mitigate interaction between the lower gas flow and a powder bed disposed on the build platform. The combination of the upper and lower gas flows may thus substantially reduce or eliminate gas recirculation within the chamber, and facilitate the exhaust of smoke and/or particulate matter from inside the chamber through an exhaust outlet of the AM system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An additive manufacturing system, comprising:
   a housing defining a chamber;
   a build platform disposed in a lower portion of the chamber at a first elevation with respect to the chamber;
   a lower gas inlet disposed proximate an upstream end portion of the chamber and configured to supply a lower gas flow, wherein the lower gas inlet is disposed at a second elevation with respect to the chamber;
   a contoured surface extending between the lower gas inlet and the build platform and configured to direct the lower gas flow from the second elevation to the first elevation, wherein the contoured surface discharges the lower gas flow in a direction substantially parallel to the build platform;
   one or more gas delivery devices coupled to the lower gas inlet and configured to regulate one or more flow characteristics of the lower gas flow; and
   a gas outlet disposed in a downstream end portion of the chamber, wherein the gas outlet is configured to discharge the lower gas flow from the chamber.

2. The additive manufacturing system of claim 1, wherein the contoured surface comprises a concave portion disposed downstream of the lower gas inlet, wherein the concave portion extends toward the first elevation at an angle relative to the build platform and is configured to direct the lower gas flow in an intermediate direction toward the build platform.

3. The additive manufacturing system of claim 2, wherein the contoured surface comprises a convex portion extending tangentially from the concave portion toward the build platform, wherein the convex portion is configured to induce a fluid guiding effect to redirect the lower gas flow from the intermediate direction to the direction substantially parallel to the build platform.

4. The additive manufacturing system of claim 3, wherein a radius of curvature of the concave portion and a radius of curvature of the convex portion are each between 0.5% of a length of the chamber and 200% of the length of the chamber.

5. The additive manufacturing system of claim 1, wherein the contoured surface further comprises:
   a convex portion disposed downstream of the lower gas inlet, wherein the convex portion extends toward the first elevation at an angle relative to the build platform and is configured to induce a fluid guiding effect to redirect the lower gas flow in an intermediate direction toward the build platform; and
   a concave portion extending tangentially from the convex portion toward the build platform, wherein the concave portion is configured to redirect the lower gas flow from the intermediate direction to the direction substantially parallel to the build platform.

6. The additive manufacturing system of claim 1, comprising an upper gas inlet disposed in an upper portion of the chamber and configured to supply an upper gas flow in the direction substantially parallel to the build platform, wherein the upper gas inlet is coupled to the one or more gas delivery devices, and wherein the one or more gas delivery devices are configured to regulate one or more flow characteristics of the upper gas flow.

7. The additive manufacturing system of claim 1, comprising an additional contoured surface offset from the contoured surface by a distance to define a channel extending a length from the lower gas inlet to a channel outlet defined within a bottom wall of the chamber.

8. The additive manufacturing system of claim 7, wherein the lower gas inlet is defined within a rear wall of the housing that is oriented cross-wise to the bottom wall, such that the lower gas inlet is oriented cross-wise to the channel outlet.

9. The additive manufacturing system of claim 7, wherein the distance decreases along the length of the channel.

10. The additive manufacturing system of claim 1, comprising:
    a sensor in fluid communication with the lower gas flow;
    a flow generating device of the one or more gas delivery devices, wherein the flow generating device is configured to generate the lower gas flow; and a controller comprising a processor and a memory, wherein the processor is communicatively coupled to the sensor and the flow generating device, wherein the processor is configured to receive feedback from the sensor indicative of a flow parameter of the lower gas flow, and wherein the processor is configured to adjust an operational speed of the flow generating device when the flow parameter deviates from a target parameter by a predetermined threshold amount.

11. The additive manufacturing system of claim 10, wherein the flow parameter comprises a flow rate of the lower gas flow, a flow velocity of the lower gas flow, a temperature of the lower gas flow, a composition of the lower gas flow, or a combination thereof.

12. The additive manufacturing system of claim 1, wherein the first elevation is disposed below the second elevation.

13. An additive manufacturing system, comprising:
a housing defining a chamber;
a build platform disposed in a lower portion of the chamber;
a lower gas inlet positioned a distance above or below the build platform in an upstream end portion of the chamber, wherein the lower gas inlet is configured to supply a lower gas flow;
a contoured surface extending tangentially between the lower gas inlet and the build platform and configured to direct the lower gas flow from the lower gas inlet toward the build platform, wherein the lower gas flow is configured to flow along the contoured surface and discharge from the contoured surface in a direction substantially parallel to the build platform;
an upper gas inlet disposed in a first side wall of an upper portion of the chamber and configured to supply an upper gas flow in the direction substantially parallel to the build platform;
one or more gas delivery devices coupled to the lower and upper gas inlets and configured to regulate one or more flow characteristics of the lower and upper gas flows; and
a gas outlet disposed in a second side wall of the chamber, opposing the first side wall, wherein the gas outlet is configured to discharge the lower and upper gas flows from the chamber.

14. The additive manufacturing system of claim 13, wherein the lower gas flow is directed along the contoured surface via a Coanda effect.

15. The additive manufacturing system of claim 13, wherein the contoured surface comprises a concave portion disposed upstream of a convex portion, wherein an intermediate portion of the contoured surface extends tangentially between the concave portion and the convex portion at an angle relative to the build platform.

* * * * *